UNITED STATES PATENT OFFICE.

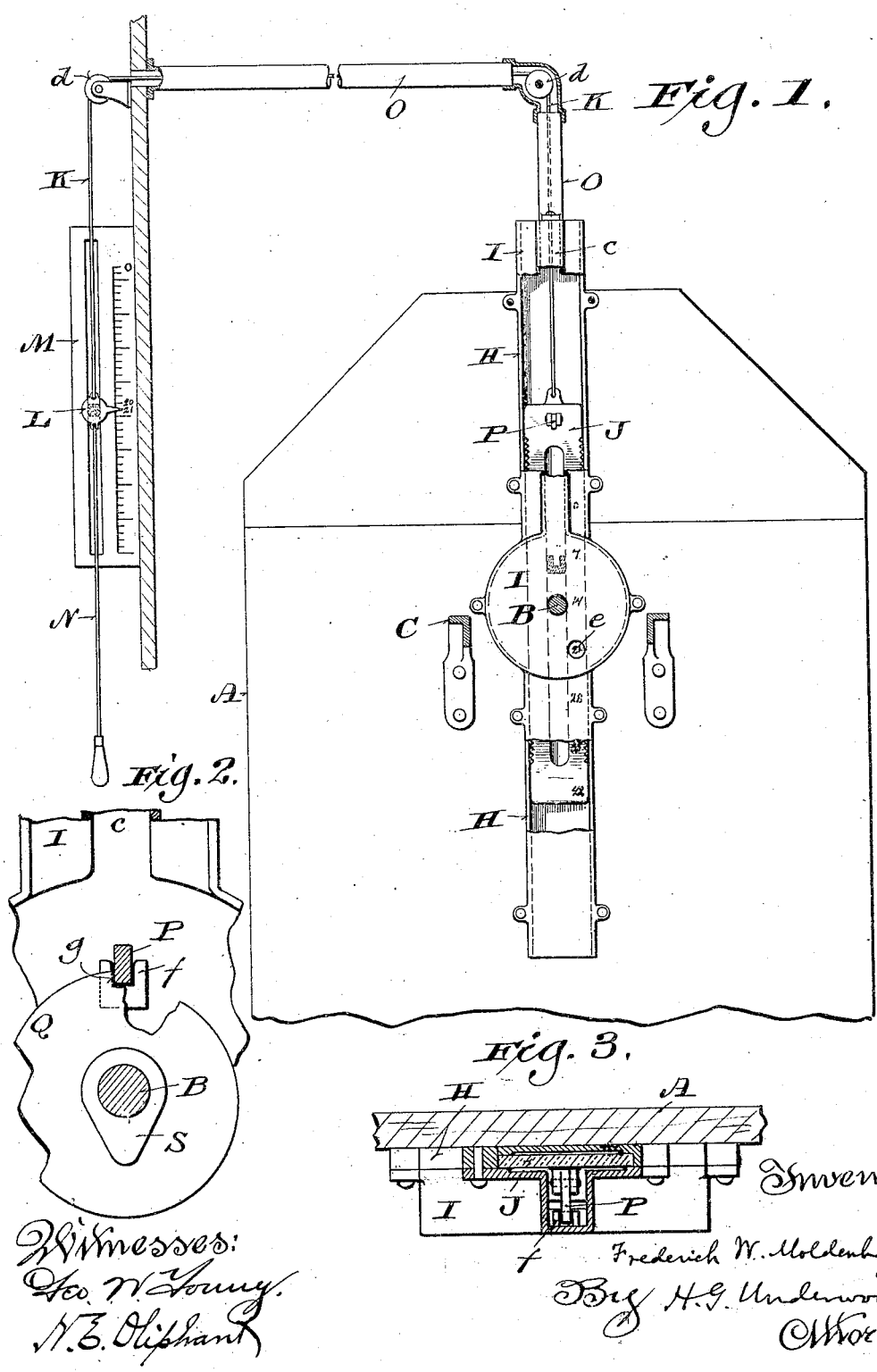

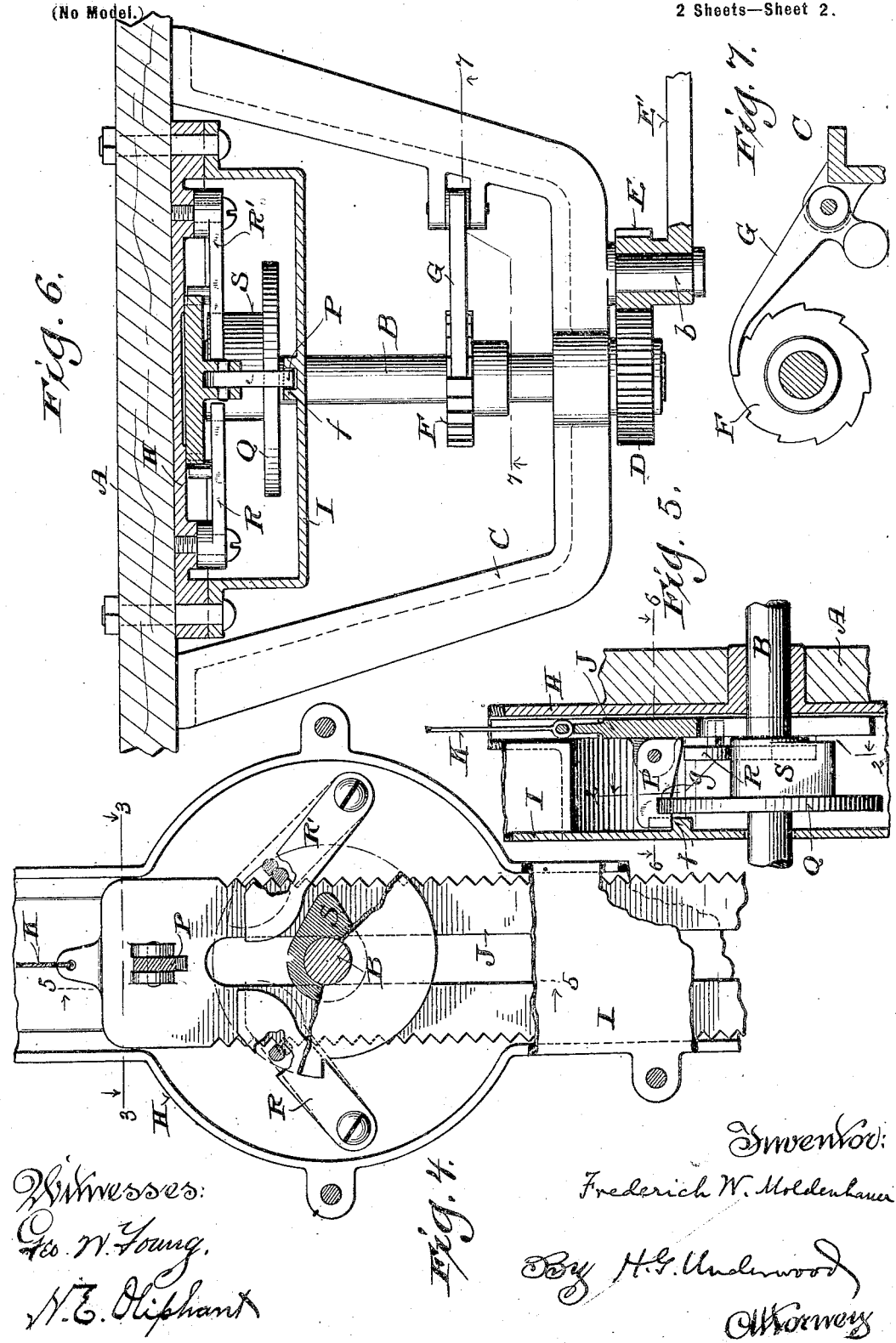

FREDERICH W. MOLDENHAUER, OF OCONOMOWOC, WISCONSIN.

SHAFT-STOP MECHANISM.

SPECIFICATION forming part of Letters Patent No. 648,701, dated May 1, 1900.

Application filed January 29, 1900. Serial No. 3,078. (No model.)

*To all whom it may concern:*

Be it known that I, FREDERICH W. MOLDENHAUER, a citizen of the United States, and a resident of Oconomowoc, in the county of Waukesha and State of Wisconsin, have invented certain new and useful Improvements in Shaft-Stop Mechanism; and I do hereby declare that the following is a full, clear, and exact description thereof.

My invention has for its object to provide simple economical mechanism for predetermining the number of revolutions of a shaft, and is especially designed for utilization in connection with a pump-shaft to prevent dairymen from overdrawing their allowance of skim-milk or whey from the waste-tank of a creamery or cheese-factory, said invention consisting in certain peculiarities of construction and combination of parts hereinafter particularly set forth with reference to the accompanying drawings and subsequently claimed.

Figure 1 of the drawings represents a side elevation of a portion of the curb of an elevator-pump and mechanism whereby a shaft of the pump is limited to a variable predetermined number of revolutions in a direction necessary to elevate and empty buckets, certain of the parts being broken and others in section; Fig. 2, a detail elevation, partly in section, this view being indicated by line 2 2 in Fig. 5; Fig. 3, a detail plan view, partly in horizontal section, on the plane indicated by line 3 3 in Fig. 4; Fig. 4, a partly-broken sectional elevation of the mechanism for regulating the revolutions of the pump-shaft in a direction necessary to elevate and empty buckets; Fig. 5, a sectional view indicated by line 5 5 in Fig. 4; Fig. 6, a detail plan view, partly in horizontal section, on the plane indicated by line 6 6 in Fig. 5; and Fig. 7, a detail partly-sectional elevation indicated by line 7 7 in Fig. 6.

Referring by letter to the drawings, A indicates the curb of an ordinary elevator-pump, and in practice this curb is set on a platform covering a skim-milk or whey tank at a creamery or cheese-factory. The upper chain-wheel shaft B of the pump is elongated and extends through a casing bolted or otherwise rigidly secured to a side of the curb A, and a horizontal bracket C, made fast to said curb, is provided with an outer bearing for said shaft. A spur-wheel D, fast on the outer end of the pump-shaft, meshes with a pinion E, loose on a stud $b$, projecting from bracket C, and by a crank E', extending from the pinion-hub, the pump is operated. The shaft B is provided with a ratchet-wheel F, and a gravity-detent G, in pivotal connection with ears of the bracket C, is arranged to be engaged with the ratchet-wheel when it is desirable to hold said shaft against movement reverse to that necessary for the elevation and discharge of the skim-milk or whey. The detent being thrown out of engagement with the ratchet-wheel, a reverse movement may be imparted to shaft B, so that filled pump-buckets stopped in their ascent may be run back to empty their contents in the tank when the weather is cold.

The aforesaid casing is of angular contour above and below a preferably circular enlargement thereof about midway of its length, and, as herein shown, said casing, as a matter of preference, consists of separable sections H I, the outer sections being provided with an upper raised channel-rib $c$ longitudinal thereof.

Loose in the casing is a slide J, having a longitudinal slot through which the pump-shaft B passes, and this slide is attached to one end of a flexible runner K, trained on pulleys $d$, the other end of the runner being connected to a pointer-block L in sliding engagement with a longitudinal slot in a scale-plate M, arranged inside of a creamery or cheese-factory, and a pull N is shown in connection with the pointer-block. A scale corresponding to the one on plate M may be marked on the slide J and an opening $e$ provided in the aforesaid casing through which to observe the slide-scale.

The skim-milk or whey tank being outside the creamery or cheese-factory more or less distant from scale-plate M, the intermediate portion of the flexible runner K may be trained in a protector-pipe O, connecting said casing and a wall of said creamery or cheese-factory, as herein shown.

The slide J is shown as having its longitudinal edges toothed at regular intervals, and in practice, as shown in Fig. 4, the teeth of one edge are alined with intervals between teeth of the opposite edge. In pivotal connection with outer ears of the slide is a latch P, that moves in the channel-rib $c$ of the adjacent casing when said slide is pulled up out of normal position, and a notched lug $f$ on the inside of the enlargement of the outer casing-section is engaged by the latch when said slide is full down. In this position the latch operates as a stop in the way of the projection $g$ of a cam-wheel Q, fast on shaft B, to prevent the latter from being turned in the direction necessary to elevate and empty pump-buckets; but it is obvious that said latch will not interfere with a reverse movement of said shaft.

In pivotal connection with the rear portion of the casing aforesaid, inside its enlargement, I show gravity-pallets R R', that operate in conjunction with the teeth of slide J, and a wiper S operates to trip the pallets out of engagement with said slide.

In practice assume, for example, that the capacity and disposition of the pump-buckets are such that each turn of crank B in the proper direction will elevate and discharge one gallon of milk or whey and that a dairyman is entitled to twenty-one gallons of the fluid, the pull N will be operated to bring the pointer L to the twenty-first mark in descending order on the scale-plate M and at the same time lift the slide J a distance equal to twenty-one of its teeth, the pallets R R' being arranged so as not to interfere with this operation. If the slide be scaled and marked to correspond with the scale in the creamery or cheese-factory and an opening provided in the casing through which to observe the scale and marking on said slide, the dairyman at the pump has opportunity to determine the proper elevation of the aforesaid slide before operating the pump to obtain the quantity of milk or whey to which he is entitled. Now as the pump-shaft B is turned in the proper direction the pallets R R' are alternately disengaged from the slide J by the wiper S, and said slide descends tooth by tooth until the latch P enters the notch of stationary lug $f$ to oppose projection $g$ of cam-wheel Q, and thereby prevent further turning of said shaft in the direction necessary to elevation and delivery of the milk or whey, the twenty-one full turns having resulted in the discharge of as many gallons of the fluid. If preferred, the machine may be organized to measure the milk or whey by pounds instead of gallons.

While an elevator-pump has been shown and described, the mechanism for controlling delivery of skim-milk or whey in variable quantities may be utilized in connection with a lift-suction or other form of pump, and in matters of mechanical detail said mechanism may be varied from what is herein shown without departure from my invention. It is also to be understood that the mechanism herein described may be utilized in connection with various machines for predetermining the number of revolutions of shafts constituting parts of same.

Having thus described my invention, what I claim as new, and desire to secure by Letters Patent, is—

1. The combination of a rotatory shaft, a toothed slide and guide for same, pallets engageable with the slide, a pallet-tripper in conjunction with the shaft, and means in connection with said slide and shaft for locking the latter when the former is in normal position.

2. The combination of a rotatory shaft, a toothed slide and guide for same, pallets engageable with the slide, a pallet-tripper in conjunction with the shaft, means in connection with said slide and shaft for locking the latter when the former is in normal position, and other means coöperative with said shaft to indicate variable arbitrary quantities corresponding to predetermined revolutions of the aforesaid pump.

3. The combination of a rotatory shaft, a toothed and scaled slide, a slide-casing provided with an opening through which to observe the slide-scale, pallets in the casing engageable with the slide, a pallet-tripper in conjunction with the shaft, and means in connection with said slide and shaft for locking the latter when the former is in normal position.

4. The combination of a rotatory shaft, a toothed and scaled slide, a slide-casing provided with an opening through which to observe the slide-scale, pallets in the casing engageable with the slide, a pallet-tripper in conjunction with the shaft, means in connection with said slide and shaft for locking the latter when the former is in normal position, and other means for determining adjustment of said slide.

5. The combination of a rotatory shaft, a toothed slide, a casing for the slide, pallets in the casing engageable with the slide, a pallet-tripper on the shaft, a latch carried by the slide, a latch-seat in said casing, and a latch-abutting device in connection with the shaft.

6. The combination of a rotatory shaft, a toothed slide, a casing for the slide, pallets in the casing engageable with the slide, a latch carried by the slide, a latch-seat in said casing, a latch-abutting device in connection with the shaft, and means for determining adjustment of said slide.

7. The combination of a rotatory shaft, a toothed slide, a casing for the slide, a distant scale-plate, a movable scale-plate pointer, a pulley-supported flexible runner connecting the slide and pointer, pallets in the casing engageable with the slide, a pallet-tripper on the shaft, a latch carried by the slide, a latch-seat in said casing, and a latch-abutting device in connection with the shaft.

8. The combination of an elevator-pump curb provided with a casing, the pump-shaft extending through the casing, a toothed slide in the casing, means for determining adjustment of the slide, pallets in the casing engageable with the slide, a pallet-tripper on the shaft, a latch-seat in said casing, a cam-wheel on the shaft arranged to have its projection abut the latch when the latter is seated, a ratchet-wheel on said shaft, and a shaft-supporting bracket provided with a pivotal detent for the ratchet-wheel.

In testimony that I claim the foregoing I have hereunto set my hand, at the city of Oconomowoc, in the county of Waukesha and State of Wisconsin, in the presence of two witnesses.

FREDERICH W. MOLDENHAUER.

Witnesses:
ANTHONY B. ROGAN,
GUSTAV MEISSNER.